(12) United States Patent
Manenti et al.

(10) Patent No.: US 9,630,839 B2
(45) Date of Patent: Apr. 25, 2017

(54) SYNGAS PRODUCTION BY $CO_2$ REDUCTION PROCESS

(71) Applicant: POLITECNICO DI MILANO, Milan (IT)

(72) Inventors: Flavio Manenti, Milan (IT); Sauro Pierucci, Milan (IT); Lucio Molinari, Milan (IT)

(73) Assignee: POLITECNICO DI MILANO, Milan (IT)

( * ) Notice: Subject to any disclaimer, the term of this patent is extended or adjusted under 35 U.S.C. 154(b) by 0 days.

(21) Appl. No.: 14/907,573

(22) PCT Filed: Jul. 31, 2014

(86) PCT No.: PCT/IB2014/063593
§ 371 (c)(1),
(2) Date: Jan. 26, 2016

(87) PCT Pub. No.: WO2015/015457
PCT Pub. Date: Feb. 5, 2015

(65) Prior Publication Data
US 2016/0185596 A1 Jun. 30, 2016

(30) Foreign Application Priority Data
Aug. 2, 2013 (IT) .............................. MI2013A1322

(51) Int. Cl.
*C01B 3/06* (2006.01)
*C01B 17/04* (2006.01)
*C01B 17/50* (2006.01)

(52) U.S. Cl.
CPC ................ *C01B 3/06* (2013.01); *C01B 17/04* (2013.01); *C01B 17/0408* (2013.01);
(Continued)

(58) Field of Classification Search
USPC .................................................. 423/651–654
See application file for complete search history.

(56) References Cited

U.S. PATENT DOCUMENTS 4,171,347 A  10/1979  Hass
4,999,178 A   3/1991  Bowman

FOREIGN PATENT DOCUMENTS

GB        2143225 A       2/1985

OTHER PUBLICATIONS

Clark, et al., "Comments on teh Role of H2S in the chemistry of earth's early atmosphere and in prebiotic synthesis", Journal of Molecular Evolution, vol. 47, No. 2, Aug. 1, 1998, pp. 127-132.

(Continued)

*Primary Examiner* — Melvin C Mayes
*Assistant Examiner* — Kenneth Vaden
(74) *Attorney, Agent, or Firm* — Silvia Salvadori, P.C.; Silvia Salvadori (57) ABSTRACT

A process for producing synthesis gas (syngas) comprising the endothermic reaction between $CO_2$ and $H_2S$, wherein the energetic supply is provided by the exothermic oxidation of a small portion of $H_2S$ to $SO_2$ according to the following reaction scheme: R2: $H_2S+1.5O_2 \rightarrow SO_2+H_2O$ said process being carried out according to the following overall theoretical reaction scheme R1, not taking into account the aforementioned exothermic reaction R2, R1: $CO_2+2H_2S \rightarrow CO+H_2+S_2+H_2O$ wherein the amount of fed oxygen is comprised between 5% and 25% by volume over the total volume of fed reactants gaseous mixture.

17 Claims, 5 Drawing Sheets

(52) U.S. Cl.
CPC ............. *C01B 17/508* (2013.01); *Y02E 60/36* (2013.01); *Y02P 20/129* (2015.11)

(56) References Cited

OTHER PUBLICATIONS

International Search Report of PCT/IB2014/063593 of Nov. 11, 2014.

Towler et al., "Development of a zero-emission sulfur-recovery process", Icheme Research Event, XX, XX, Jan. 1, 1994, pp. 333/334.

Towler, et al., "Development of a zero-emission sulfur recovery. 1. Thermochemistry and reaction kinetics of mixtures of hydrogen sulfide and carbon dioxide at high temperature", Industrial & Engineering Chemistry Research, vol. 32, No. 11, Nov. 1, 1993, pp. 2800-2811.

Towler, et al., "Development of a zero-emission sulfur-recovery process. 2. Sulfur-recovery process based on the reactions of hydrogen sulfide and carbon dioxide at high temperature", Industrial & Engineering Chemistry Research, vol. 32, No. 11, Nov. 1, 1993, pp. 2812-2819.

Written Opinion of PCT/IB2014/063593 of Nov. 11, 2014.

Sitting, M., "Oxidation processes of hydrocarbon raw materials", Khimiya, Moscow, 1970, p. 84.

SYNGAS PRODUCTION BY CO₂ REDUCTION PROCESS

This application is a U.S. national stage of PCT/IB2014/063593 filed on 31 Jul. 2014, which claims priority to and the benefit of Italian Application No. MI2013A001322 filed on 2 Aug. 2013, the contents of which are incorporated herein by reference in their entireties.

FIELD OF THE INVENTION

The present invention relates a production process of synthesis gas starting from $CO_2$ and $H_2S$, said reactants being generated by industrial conventional processes or separated by conventional industrial purification processes.

BACKGROUND OF THE INVENTION

Synthesis gas (syngas) is mainly obtained by partial oxidation of hydrocarbon, usually methane. This process is represented by a cathedral oven provided with tubes containing a catalyst through which methane and steam flow to convert these reactants into CO and $H_2$, i.e. syngas. The purpose of the oven is to heat the tubes by heat radiation to reach the reaction temperatures up to 800° C. Syngas is then cooled down and separated down stream the oven. In alternative syngas is produced from coal gasification. The gasification reactor is fed with coal oxygen and steam to achieve a syngas stream by partial oxidation reaction of the coal itself. Nowadays gasification is technologically feasible also for biomasses and agricultural/industrial residues or solid urban waste, but substantially with the same finality to partially oxidize the reactants in order to obtain syngas.

SUMMARY OF THE INVENTION

The Applicant has found a process for producing synthesis gas (syngas) comprising the endothermic reaction between $CO_2$ and $H_2S$.

The energetic supply of this syngas production process is provided by the exothermic oxidation of a portion of $H_2S$ to $SO_2$ according to the following reaction scheme:

R2: $H_2S + 1.5O_2 \rightarrow SO_2 + H_2O$

This syngas production process is carried out according to the following overall theoretical reaction scheme R1, not taking into account the aforementioned R2 reaction R1: $CO_2 + 2H_2S \rightarrow CO + H_2 + S_2 + H_2O$ This process is further characterized in that the amount of fed oxygen is comprised between 5% and 25% by volume over the total volume of fed reactants gaseous mixture.

DETAILED DESCRIPTION OF THE INVENTION

For the purposes of the invention the wording "overall theoretical reaction scheme" means the general and stoichiometric scheme of reactants conversion. This scheme and all associated stoichiometry may vary according to the reactor methodologies as well the operating conditions thereof.

For the purposes of the present invention the definition "catalytic train of the Claus unit" means the series of catalytic converters and condensers for sulfur recovery that in Claus unit are positioned downstream the thermal section.

For the purposes of the present invention the wording "oxygen" means pure oxygen, air, oxygen-enriched air, combustion air etc. Preferably oxygen is pure oxygen or air.

For the purposes of the present invention the wording "operating unit" means a plant for carrying out the process of the invention comprising a reactor at least one separation section, separating syngas from the other components of flue gases leaving said thermal or regenerative reactor, and least one recycling section of the unconverted reactants.

For the purposes of the present invention the wording "independent operating unit" means an operating unit to carry out the process according to the present invention, wherein the at least one separating section and/or at least one recycling section is apart from those of other operative units destined to different industrial processes.

For the purposes of the present invention for "small portion of $H_2S$" it is intended the volume % of $H_2S$ directly reacting with $O_2$ according to the aforementioned reaction R2, therefore (depending on the volume of $O_2$ entering the reactor) calculated on the total volume of fed $H_2S$.

For the purposes of the present invention the wording "efficient regeneration" means that the regenerative section of the reactor is able to significantly preheat the feed up to temperature close to the conditions of the thermal section of the reactor (i.e. over 1000° C.).

I) Production of Syngas in the Presence of Oxygen/Air

The process of the invention is generally carried out by feeding oxygen/air in a reactor in amounts of from 5 to 25% by volume mixture based on the total gaseous mixture sent to the reactor, in order to sustain energetically the syngas endothermic production via $CO_2$ reduction, preferably in the range of 5% to 15% when the regeneration is very efficient. The process of the invention is carried out in a reactor, such as a regenerative thermal reactor or a thermal reactor, although the former is more preferred.

The regenerative thermal reactor (FIG. 2), in which syngas is produced, is preferably a tubular plug flow reactor (PFR) for the regenerative section and PFR for the thermal section internally covered with refractory and preferably provided downstream with a waste heat boiler. According to a particularly preferred embodiment this reactor section is a thermal furnace covered with refractory and provided downstream with a waste heat boiler, in which medium/high pressure vapours are generated at the shell side by reactor flue gases that are cooled down entering the waste heat boiler at the tubes side.

Figure 2:
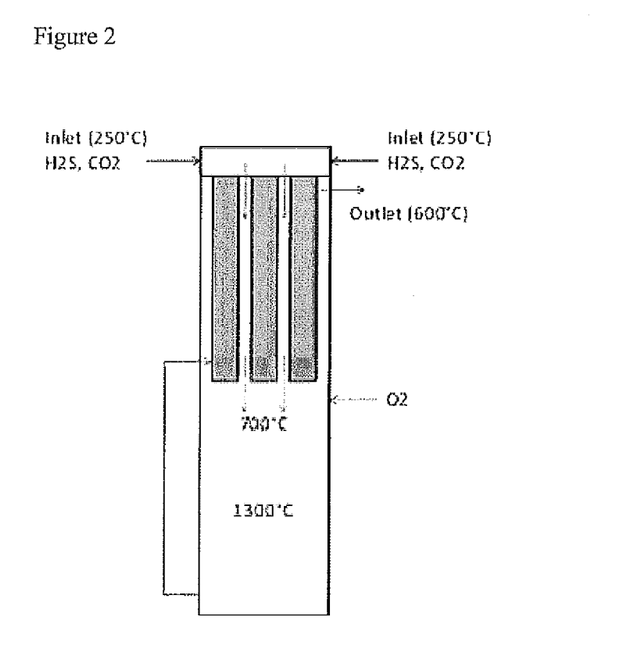
FIG. 2 represents a scheme of a regenerative thermal reactor utilized in the process of the invention in the presence of oxygen or air.

The regenerative thermal reactor preferably used in the process of the invention may have different configurations with reactants feed positioned in one or different reactor areas.

The process according to the present invention may also be carried out in a thermal reactor, that is a PFR, through which gases pass with a turbulent flow and provided downstream with a waste heat boiler, like that previously described.

The reaction temperatures of the process according to the present invention are preferably comprised between 800 and 1550° C.

More preferably the reaction temperatures are comprised between 1300 and 1550° C. when a high sequestering therefore a high conversion of $CO_2$ and $H_2S$ is required, whereas the process is carried out at lower temperatures (900-1100° C.) when the target is to obtain a relatively high $H_2/CO$ ratio.

Fed oxygen sustains thermally the reaction R1 through the combustion of small part of $H_2S$ according to the following reaction scheme:

R2: $H_2S + 1.5 O_2 \rightarrow SO_2 + H_2O$

The exercise pressure is preferably comprised between 1 and 2 absolute atm., more preferably between 1.5 and 2 atm.

The contact times are preferably between 0.1 and 3 s. more preferably between 0.5 and 1.5 s.

These parameters were obtained by carrying out a simulation we describe herein below only for illustrative but not limitative purposes.

The regenerative thermal reactor, or in alternative the thermal reactor used in the process according to the present invention is simulated by using complex kinetic schemes (Manenti et al., Multiscale modelling of Claus thermal furnace and waste heat boiler using detailed kinetics, Computers and Chemical Engineering, 59, 219-225, 2013), comprising 2426 chemical reactions and 142 chemical species. The simulation cannot be conducted by using commercial software, since the main processes simulators are not provided with complex kinetic schemes. Therefore the present simulation is carried out with the abovementioned tools previously in situ validated.

Figure 1:
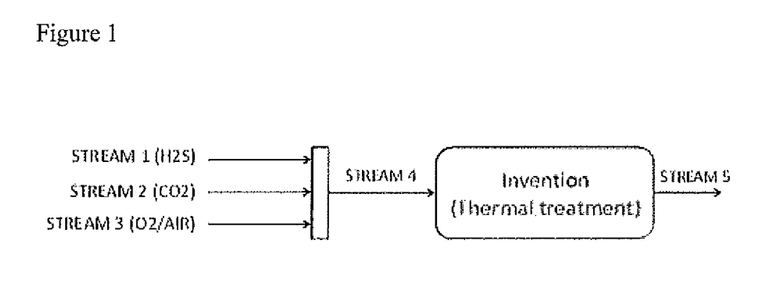
FIG. 1 represents a block diagram of a thermal reactor used in the process of the invention.

The thermal reactor is represented schematically in FIG. 1. The simulation data are reported in the following table 1.

TABLE 1

| Thermal reactor | | | |
|---|---|---|---|
| DATA | | | |
| Temp in [1] | ° C. | 250 | 250 |
| Pressure | bar | 1.5 | 1.5 |
| $CO_2$ | kmol | 10 | 10 |
| $H_2S$ | kmol | 30 | 30 |
| $O_2$ | kmol | 11.81 | 5.79 |
| RESULTS | | | |
| React. Temp. [2] | ° C. | 1500 | 1000 |
| $CO_2$ | kmol | 5.09 | 7.81 |
| $H_2S$ | kmol | 3.58 | 18.29 |

TABLE 1-continued

| Thermal reactor | | | |
|---|---|---|---|
| $S_2$ | kmol | 10.90 | 4.14 |
| $H_2$ | kmol | 5.37 | 3.67 |
| CO | kmol | 4.80 | 1.90 |
| $SO_2$ | kmol | 3.68 | 2.89 |
| $H_2O$ | kmol | 20.86 | 7.97 |
| COS | kmol | 0.11 | 0.29 |

[1] Inlet Temperature
[2] Reactor Temperature

An alternative configuration of the reactor is the proposed regenerative (energetically integrated) thermal reactor and is schematically represented in FIG. 2. The reactor receives $CO_2$ and $H_2S$ reactant streams at a relatively low temperature (e.g. 250° C.). This feedstock is preheated (e.g., up to 700° C.) with flue gases leaving the furnace. Once the above temperature is reached, oxygen is fed to further increase the temperature up to the desired value (1300-1550° C.). Flue gases are then cooled down, by exchanging heat with inlet gases. In this way a significant heat recovery is achieved, and the oxygen amount required to sustain the production of syngas is decidedly lower than that required in the thermal reactor.

The simulation data for the regenerative reactor are reported in the following table 2.

TABLE 2

| Regenerative reactor | | | |
|---|---|---|---|
| DATA | | | |
| Temp. In [1] | ° C. | 700 | 700 |
| Pressure | bar | 1.5 | 1.5 |
| $CO_2$ | kmol | 10 | 10 |
| $H_2S$ | kmol | 30 | 30 |
| $O_2$ | kmol | 9.19 | 3.47 |
| RESULTS | | | |
| React. Temp [2] | ° C. | 1500 | 1000 |
| $CO_2$ | kmol | 4.47 | 7.44 |
| $H_2S$ | kmol | 4.32 | 19.79 |
| $S_2$ | kmol | 11.25 | 3.98 |
| $H_2$ | kmol | 6.32 | 3.99 |
| CO | kmol | 5.40 | 2.23 |
| $SO_2$ | kmol | 2.25 | 1.67 |
| $H_2O$ | kmol | 19.16 | 6.16 |
| COS | kmol | 0.13 | 0.33 |

[1] Inlet Temperature
[2] Reactor Temperature

Optimal conditions change at different operating conditions as reported hereinbelow for illustrative but not limitative purposes.

The following data are related to the proposed reaction conducted at 1300° C., 1.8 bar and 1 s residence time. Whenever the feedstock temperature is lower than the reaction temperature, additional $O_2$ is needed to increase the temperature itself.

Condition 1-High $H_2S$ Content

| T = 1300° C. | P = 1.8 bar | Residence time = 1 s |
|---|---|---|

Molar Fraction Inlet: 82% $H_2S$, 10% $CO_2$, 8% $O_2$

Output: 24.4% v syngas, $H_2/CO$ Ratio=3, no production of $SO_2$, conversion of $H_2S$=60% v and $CO_2$=70% v Since no $SO_2$ is generated, there is a high selectivity towards $H_2$ and the process is not necessary to be associated with plants directed to exhaust $SO_2$ like for example that occurring in the Claus catalytic train or in the sulphuric acid production as reported later on.

Condition 2-High $CO_2$ Content

| T = 1300° C. | P = 1.8 bar | Residence time = 1 s |

Molar Fraction Inlet: 31% $H_2S$, 62% $CO_2$, 7% $O_2$
Output: $H_2$/CO Ratio=0.2, $H_2S/SO_2$ Ratio=1, Conversion of $H_2S$=87% v and $CO_2$=35.5% v Production of SO2: possibility to couple it, for instance, with Claus catalytic converters and/or sulfuric acid plants as reported later on.

Oxygen quantity is less due to the amount of CO2 that works as Oxygen basin for H2S oxidation.

Condition 3-Optimal Claus Catalytic Converter Matching

| T = 1300° C. | P = 1.8 bar | Residence time = 1 s |

Molar Fraction Inlet: 40% $H_2S$, 52% $CO_2$, 8% $O_2$
Output: $H_2S/CO_2$ Ratio=2 (Claus optimal condition), Conversion of $H_2S$=85% v and $CO_2$=40% v, 21.5% v syngas, $H_2$/CO Ratio=0.35

2. Separation of Syngas from Other Reactor Flue Gases

Flue gases coming from the reactor are cooled down and syngas is separated from the other compounds namely $H_2S$, $CO_2$, $SO_2$, $H_2O$ and $S_2$. For this purpose the process of the invention is preferably carried out in a productive unit that, besides the regenerative thermal reactor, it further comprises at least one of conversion/condensation/compression sections allowing the separation of flue gases from said reactors. This separation can be realized in different ways, depending on the use of the different streams that, besides syngas, may be utilized industrially, and the production site, wherein the production unit for carrying out the process according to the invention is integrated with.

Herein below for illustrative but not limitative purposes are reported some preferred embodiments of productive units for conducting the process according to the present invention, said operating units being independent or integrated with operating units destined to other industrial processes.

Figure 3:
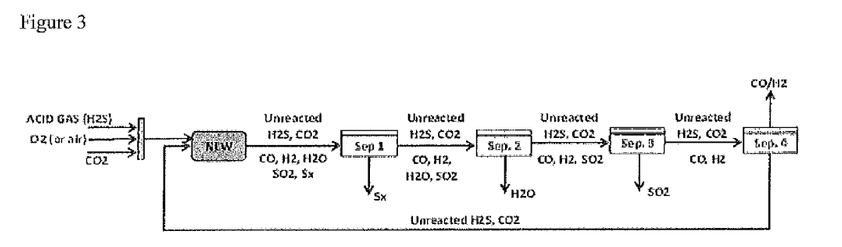
FIG. 3 represents a block diagram of an independent productive unit to carry out the process of the invention.

In FIG. 3 a preferred embodiment is depicted of an independent productive unit used for carrying out the process according to the present invention.

At the inlet of the reactor, indicated with "NEW" in the figure, preferably a regenerative thermal reactor, acid gas (mainly $H_2S$), $CO_2$ and oxygen ($O_2$) or combustion air or other fuel mixture are fed. In the regenerative thermal reactor $CO_2$ reduction to CO occurs, with $H_2$ formation through $H_2S$ pyrolysis, thereby producing syngas. $S_2$, $SO_2$ and $H_2O$ form as by products. Flue gases are cooled down in a waste heat boiler not represented in the figure. Cooling down must be sufficiently quick to avoid any recombination reactions among flue gases (Manenti et al., Design of SRU thermal reactor and waste heat boiler considering recombination reactions, Procedia Engineering, 42, 414-421, 2012). After cooling down, separation of elemental sulfur is performed in Sep.1 through condensation. Sulfur is then sent to sulfur pit and thereafter sold or used for other processes (e.g. for the preparation of sulfuric acid). The residual stream contains unreacted $H_2S$ and $CO_2$, $SO_2$, $H_2O$ and syngas. By subsequent treatments occurring separately in Sep.2, Sep.3 and Sep. 4 or occurring in the same separators combined among each other, it is possible to purify syngas. Before condensing water, sulfur vapours must be hydrogenated, to avoid that sulfur solidifies, thereby obstructing pipelines.

$SO_2$ can be used in sulfuric acid production processes. As syngas production is always associated with a compression thereof at different tens of atmospheres, no further operating cost is required if $SO_2$ condensation occurs by pressure increase. For example syngas is compressed up to 80 bar or more for methanol synthesis (Manenti et al., Considerations on the Steady-state Modeling of Methanol Synthesis Fixed-Bed Reactor, Chemical Engineering Science, 66(2), 152-162, 2011).

Compression favours also the last separation phase of syngas from unconverted $H_2S$ and $CO_2$ and optional other acid by products by conventional washing with (amine) solvent, able to sequester $H_2S$ and $CO_2$ and release syngas. Sequestered $H_2S$ and $CO_2$, once recovered from the solvent are recycled at the reactor.

The process of the invention is able to exhaust and increase the values of two by products like $H_2S$ and $CO_2$ having a strong environmental impact, thereby producing syngas with different $CO/H_2$ ratios; in addition the process of the invention, besides being energetically sustainable shows high conversion yields.

As above seen, the separations for the purification of syngas occur without additional compression costs if compared to conventional technologies of separation processes (amine washing), favouring therefore the insertion/integration of the process of the invention in conventional processes, as reported herein below.

1. Sulfur Recovery Unit with Syngas Coproduction

Figure 4:
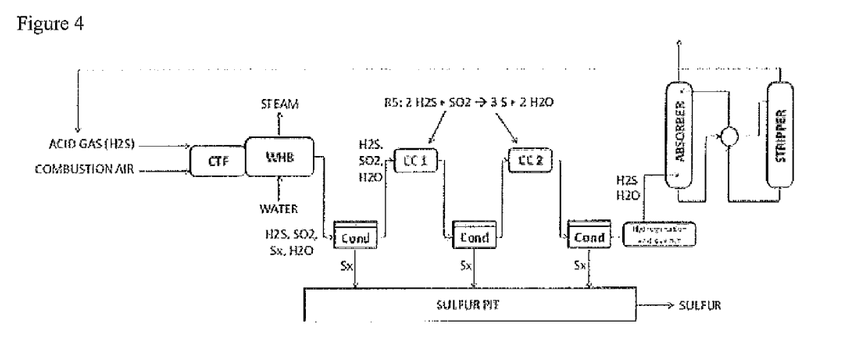
FIG. 4 represents a block diagram of a conventional Claus type productive unit for sulfur recovery.

The process of the invention is particularly useful for increasing the performances and profits of sulfur recovery units. The typical scheme of a sulfur recovery unit is depicted in FIG. 4. The acid gas to be treated is fed with non stoichiometric combustion air to a Claus furnace wherein part of $H_2S$ is converted to $SO_2$ according to the following reaction.

R4: $H_2S+1.5O_2 \rightarrow SO_2+H_2O$

The reaction is generally conducted at temperatures higher than 1000° C., with temperatures that may be higher than 1500° C. in the presence of ammonia fractions in the acid gas stream. When leaving Claus furnace flue gas is cooled down to 300° C. in a waste heat boiler with production of medium pressure vapor. A condenser downstream the waste heat boiler completes cool down by separating sulfur by condensation. Condensed sulfur is sent to liquid sulfur pit. The stream, thus free from sulfur, mainly consisting of $H_2S$, $SO_2$ and $H_2O$ enters the first Claus catalytic converter CC1, wherein the following reaction occurs:

R5: $2H_2S+SO_2 \rightarrow 3/2S_2+H_2O$

This is an equilibrium reaction, requiring to be performed a multiple step process, with intermediate thermal treatment and subsequent intermediate removal of the product ($S_2$). With 2-3 catalytic steps yields higher than 90% can be reached. Tail residue, usually contains a small percentage of unconverted $H_2S$ (for example when molar ratios $H_2S/SO_2$ higher than 2 are present in flue gases leaving Claus furnace). This residue is then washed with solvent for residual $H_2S$ abatement. $H_2S$ is then released from the stripper head and upstream recycled at Claus furnace feed, in addition to freshly fed acid gas.

Figure 5:
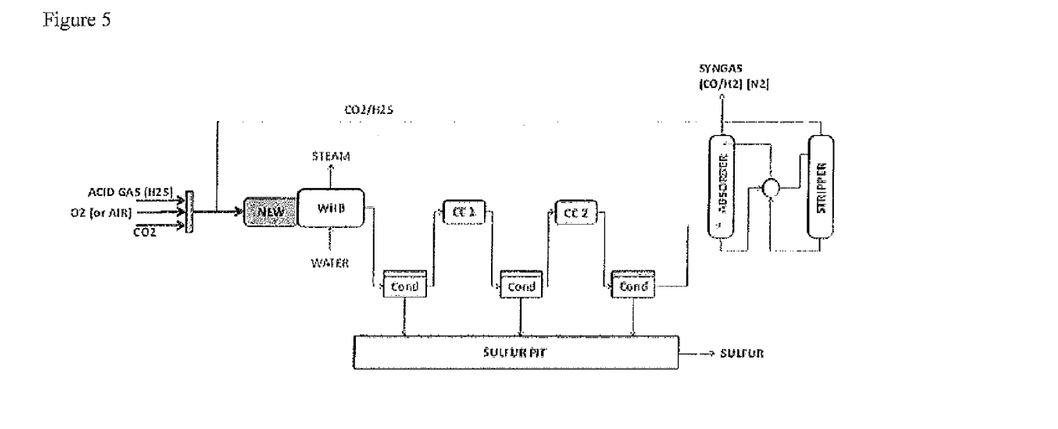
FIG. 5 represents a block diagram of a productive unit to carry out the process of the invention integrated with a Claus type catalytic train.

The process of the invention allows to use to the best the technology of conventional Claus process and producing syngas with decidedly low costs. A possible application is represented in FIG. 5. Flue gases coming from syngas reactor NEW are sent to the classic catalytic train converter of the Claus process (sulfur unit recovery) upstream or downstream the first condenser Cond.

After the first sulfur removal, the mixture containing $CO_2$, $H_2S$, $SO_2$, $H_2O$ and syngas is fed at the catalytic train CC1-CC2, wherein the Claus reaction R5 occurs. Syngas is inert both on the catalytic bed (not titanium based catalyst) and in intermediate sulfur condensing and removal operating conditions. Therefore flue gases coming from the third condenser Cond are unconverted $CO_2$, $H_2S$ and syngas. Syngas is recovered at the top of the amine washing column (ABSORBER in FIG. 5), whereas $H_2S$ and $CO_2$ are recovered at the top of the stripper (STRIPPER in the same figure) and recycled upstream the reactor. The operating unit to carry out the process of the invention integrated with Claus sulfur recovery unit (in this specific example only with Claus catalytic train) allows to exhaust $CO_2$ by $H_2S$ reduction, thereby coproducing syngas and elemental sulfur.

In FIGS. 4 and 5 the hydrogenation reactor operating the sulfur vapours and sulfurated by products reduction and the quench tower performing cooling down of flue gases and process water condensation upstream the absorber are not reported.

2. Sulfuric Acid Production Unit

Figure 6:
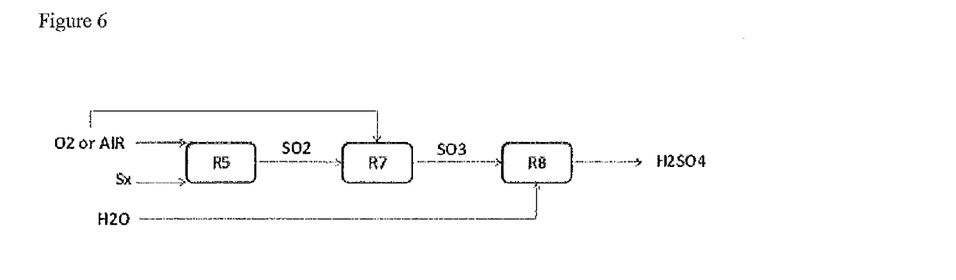
FIG. 6 represents a block diagram of a conventional type productive unit for producing sulfuric acid

A production unit of sulfuric acid is schematically represented in FIG. 6. In particular the production process encompasses the primary oxidation of sulfurated compounds, for example acid gas ($H_2S$) according to the above mentioned global reaction R4: $H_2S+1.5O_2 \rightarrow SO_2+H_2O$, The successive secondary oxidation of $SO_2$:

R6: $SO_2+0.5O_2 \rightarrow SO_3$ and finally $SO_3$ absorption in water:

R7: $SO_3+H_2O \rightarrow H_2SO_4$

Figure 7:
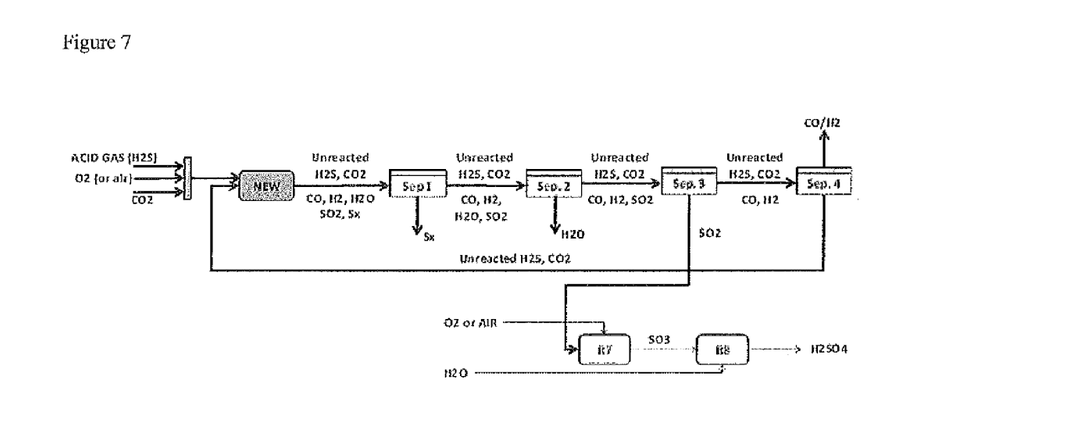
FIG. 7 represents a block diagram of a productive unit for carrying out the process of the invention integrated with the productive unit for producing sulfuric acid.

The process according to the present invention may be integrated with the aforementioned process. The insertion of an independent operating unit to carry out the process of the invention in a possible revamp is reported in FIG. 7. In this case the thermal furnace of direct oxidation of $H_2S$ to $SO_2$ according to the aforementioned reaction R4 is replaced by the reactor indicated with NEW in FIG. 7, preferably a regenerative thermal reactor, wherein the process according to the present invention is carried out and from which $SO_2$ is in any case obtained.

The following advantages of this revamp are obtained: besides the sulfuric acid production, the revamp allows to obtain syngas associated with $CO_2$ abatement, which have a considerable economic value.

Purification of Natural Gas

Natural gas is extracted by gases wells in the form of a gas or a volatile product released by liquid masses or porous solids. In any case it is a mixture of the so called light and volatile hydrocarbon compounds, in part defined as incondensable (i.e. methane) because of their very low condensation temperature. Very often natural gas contains a more or less marked presence of $H_2S$ and $CO_2$ according to the location of the specific deposit. For example Kashgan site in Kazakhstan, one of the world largest gas natural deposit, has an elevated amount of $H_2S$ (about 20% on the total natural gas content). Therefore the need is felt to purify natural gases from $CO_2$ and $H_2S$ and the most known technology to remove these contaminants is the amine sweetening (washing) previously mentioned.

Once separated from natural gas, these compounds are often re-injected in the deposits because of the impossibility of a removal thereof. The process of the invention is particularly attractive for sequestering and converting $CO_2$ and $H_2S$ coming also from different streams and processes, thereby producing syngas as well as elemental sulfur in case the invention is integrated with sulfur recovery units. The process of the invention is even more attractive in case the deposits are already provided with amine washing columns, which the reactor, preferably a regenerative thermal reactor, to carry out the process according to the present invention may be connected to.

4. Production Unit Integrated in a Production Unit for Producing Methanol.

The invention allows to produce syngas for methanol synthesis occurring according to the overall reaction (Manenti et al., Considerations on the Steady-state Modeling of Methanol Synthesis Fixed-Bed Reactor, Chemical Engineering Science, 66(2), 152-162, 2011):

R8: $CO+2H_2 \rightarrow CH_3OH$

This synthesis requires elevated pressures (from 80 bar on) and $H_2/CO$ ratios higher than 2 (preferably higher than 3-4) to obtain yields of 6-7% (yields of the industrial processes). An independent operating unit comprising a reactor, preferably a regenerative thermal reactor, to carry out the process according to the present invention allows to obtain syngas to be used in methanol production.

Figure 8:
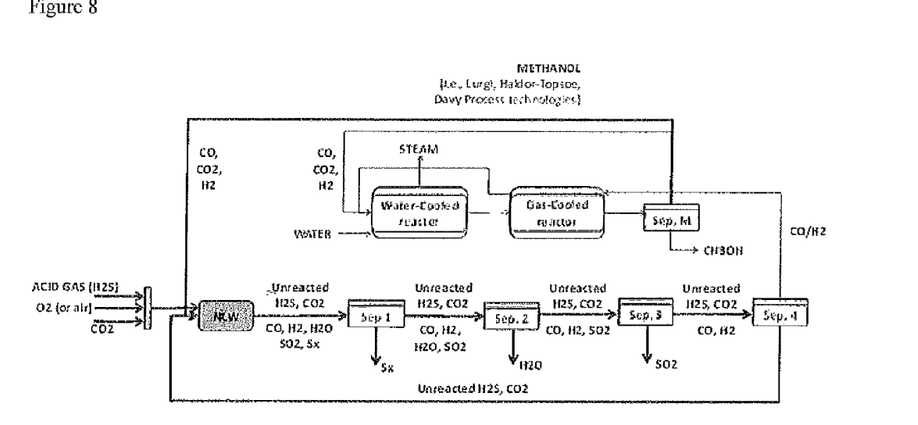
FIG. 8 represents a block diagram of a production unit for carrying out the process of the invention coupled with a production unit destined to methanol production.

FIG. 8 reports a scheme of an operating unit for example to produce methanol according to Lurgi, Casale and Davy Process Technology (Manenti et al., Considerations on the Steady-state Modeling of Methanol Synthesis Fixed-Bed Reactor, Chemical Engineering Science, 66(2), 152-162, 2011). In the synthesis reaction of methanol also $CO_2$ is involved (reverse water gas shift reaction), that, together with unconverted syngas, may be recycled upward the methanol reactor and/or the reactor, indicated with "NEW" in the figure, to carry out of the process of the invention, preferably a regenerative thermal reactor.

An alternative operating unit to carry out the process of the invention integrated with Claus operating unit may be also encompassed to be associated with a methanol plant production.

5. Gas to Liquid Production of Gasolines and Gasoils

Syngas is the starting reactant of Fischer Tropsch gas-to-liquid processes. In these processes, syngas is transformed into hydrocarbon compounds with progressively longer chains (indicated with the single unit —[$CH_2$]— according to the overall reaction:

R9: $CO+2H_2 \rightarrow -[CH_2]-+H_2O$.

Figure 9:
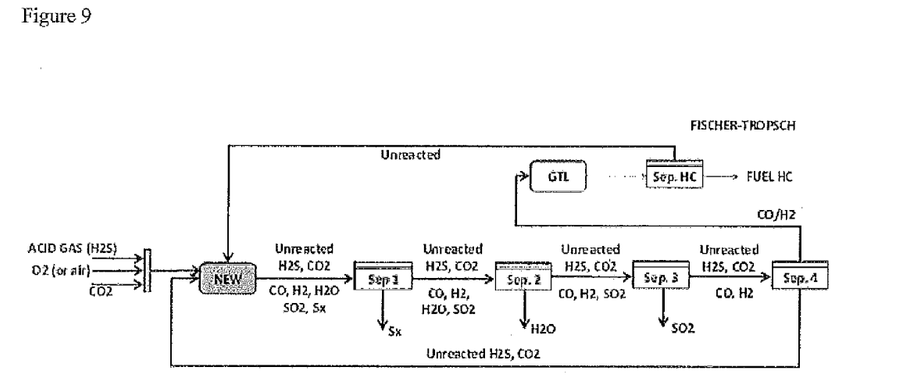
FIG. 9 represents a block diagram of a production unit for carrying out the process of the invention associated with a production unit for producing gasoline/gasoil according to Fischer Tropsch gas-to-liquids processes.

Therefore syngas prepared with the process according to the present invention in the reactor NEW and purified by passing it through the 4 separation sections September 1-September 4 may be used as starting reactant in the Fischer Tropsch gas-to-liquid process as reported in FIG. 9.

Coal Gasification

Figure 10:
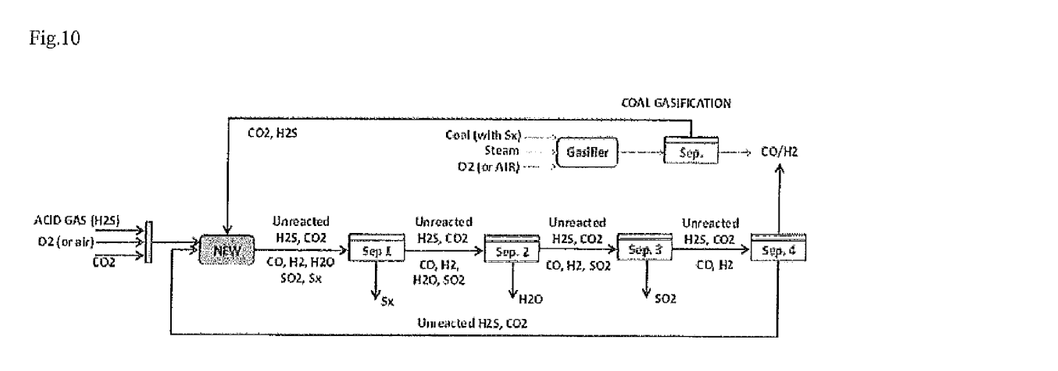
FIG. 10 represents a block diagram of a production unit for carrying out the process of the invention coupled with a production unit for producing syngas from coal gasification.

The process of the invention allows to obtain syngas as a support for coal gasification according to what reported in FIG. 10. Coal gasification reactor receives coal, steam and oxygen as reactants to produce syngas. Gasification by products are $CO_2$ and $H_2S$ (due to the presence of sulfur in loaded coal) and may be fed at the reactor NEW, preferably a regenerative thermal reactor, wherein the process according to the present invention is carried out, thereby increasing coal syngas production.

The invention claimed is:

1. A process for producing synthesis gas (syngas) comprising the endothermic reaction between $CO_2$ and $H_2S$, wherein the energetic supply is provided by the exothermic oxidation of a portion of $H_2S$ to $SO_2$ according to the following reaction scheme:

R2: $H_2S+1.5O_2 \rightarrow SO_2+H_2O$ said process being carried out according to the following overall theoretical reaction scheme R1, not taking into account the aforementioned exothermic reaction R2, R1: $CO_2+2H_2S \rightarrow CO+H_2+S_2+H_2O$ wherein the amount of fed oxygen is comprised between 5% and 25% by volume over the total volume of fed reactants gaseous mixture.

2. The process according to claim 1 wherein the amount of fed oxygen is comprised between 5% and 15%, when regeneration is efficient.

3. The process according to claim 1, wherein the reaction temperature is comprised between 850 and 1550° C. for residence times comprised between 0.1 s and 3 s.

4. The process according to claim 3, wherein said reaction temperature is comprised between 1300 and 1550° C. to obtain the maximum conversion of $CO_2$ and $H_2S$.

5. The process according to claim 3 wherein the reaction temperature is comprised between 850° C. and 1100° C. to obtain a synthesis gas with higher $H_2/CO$ ratios.

6. The process according to claim 1, being carried out in a production unit comprising:
   a reactor,
   at least one separation section of the various components of the gaseous mixture leaving said reactor, and
   at least one section for recycling the unconverted $H_2S$ and $CO_2$.

7. The process according to claim 6, wherein said reactor is a regenerative thermal flow reactor or a thermal reactor.

8. The process according to claim 7, wherein said regenerative thermal flow reactor comprises:
   a) a regenerative section being a tubular PFR, in which fed gases are preheated and through which gases pass with a turbulent flow
   b) a thermal section, being a PFR, in which the reactions R1 and R2 take place and through which gases pass with a turbulent flow,
   said regenerative thermal reactor being optionally provided downstream with a waste heat boiler.

9. The process according to claim 7 wherein said thermal reactor is a PFR, through which gases pass with a turbulent flow.

10. The process according to claim 8 wherein said waste heat boiler receives the gases leaving the reactor and said gases cool down at the tube side while generating pressure at the shell side.

11. The process according to claim 6, wherein the effluent of the reactor is purified in a separation section that comprises:
   a first separation section wherein sulfur is separated by cooling from the gaseous mixture and collected in a suitable tank;
   a second separation section wherein the gaseous mixture leaving said first separation section and comprising CO, $H_2$, $H_2O$, $SO_2$ and $CO_2$ and unconverted $H_2S$ and possibly nitrogen, in case the process is carried out in the presence of air, is cooled down to allow the separation of water by condensation,
   a possible third separation section, wherein $SO_2$ is separated from the gaseous mixture by washing or chemical conversion,
   a possible fourth separation section wherein the mixture leaving said third separation section and comprising $H_2S$, $CO_2$, CO and $H_2$ is washed to separate the synthesis gas from the reactants not yet converted, which are recovered and then recycled at the reactor,
   said separation sections being able to be combined or integrated with one another.

12. The process according to claim 6, wherein the gases entering the reactor are $H_2S$, $O_2$ or air and $CO_2$ and wherein the gases leaving said reactor are cooled in a boiler for steam recovery and then sent to a first condenser of a Claus unit for sulfur recovery, in a sulfur pit, whereas the gases leaving said condenser are sent to a catalytic conversion section, where the following reaction takes place:

R5: $2H_2S+SO_2 \rightarrow 3/2S_2+H_2O$ said catalytic conversion section comprising at least 1 catalytic converter and arranged in succession and spaced by at least 1 condenser to allow the partial recovery of sulfur, formed in each converter, said sulfur being conveyed into the aforementioned sulfur pit, and the gaseous mixture leaving the last condenser of said catalytic conversion section and comprising CO, $H_2$, $CO_2$, $H_2S$ and possibly nitrogen, pass through a hydrogenation reactor and a quenching tower, and then to a solvent washing column, wherein said gaseous mixture is washed with amines to recover the unconverted $CO_2$ and $H_2S$ at the top of a stripper and recycled at the thermal/regenerative reactor, whereas the synthesis gas is recovered at the top of said solvent washing column.

13. The process according to claim 11, wherein $SO_2$ coming from the possible third separation section is sent to a reactor R7 where the following reaction is carried out R6: $SO_2+0.5O_2 \rightarrow SO_3$ and $SO_3$ thus formed and leaving the reactor R7 is reacted in the presence of water in the reactor R8 to give sulfuric acid according to the following reaction scheme:

R7: $SO_3+H_2O \rightarrow H_2SO_4$.

14. The process according to claim 11, wherein syngas leaving the possible fourth separation section is conveyed to a production unit for producing methanol.

15. The process according to claim 6, wherein the reactants $CO_2$ and $H_2S$ come from natural gas deposits.

16. The process according to claim 11, wherein syngas leaving the possible fourth separation section is sent to a production unit for producing gasoline and gasoil through the gas-to-liquid Fischer Tropsch process.

17. The process according to claim 6, wherein the reactants $CO_2$ and $H_2S$ come totally or in part from a coal gasification unit.

* * * * *